US008845471B2

(12) United States Patent
Minadeo et al.

(10) Patent No.: US 8,845,471 B2
(45) Date of Patent: Sep. 30, 2014

(54) VARIABLE INPUT SYNCHRONOUS OUTPUT DRIVETRAIN FOR WIND TURBINE

(71) Applicant: General Electric Company, Schenectady, NY (US)

(72) Inventors: Adam Daniel Minadeo, Greenville, SC (US); Stephen Peter Luchetta, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/747,707

(22) Filed: Jan. 23, 2013

(65) Prior Publication Data
US 2014/0203561 A1  Jul. 24, 2014

(51) Int. Cl.
F16H 3/72  (2006.01)
F03D 11/02  (2006.01)
H02P 9/06  (2006.01)

(52) U.S. Cl.
CPC . H02P 9/06 (2013.01); F03D 11/02 (2013.01)
USPC .......................................................... 475/5

(58) Field of Classification Search
USPC ................................................ 475/5, 151
See application file for complete search history.

(56) References Cited

U.S. PATENT DOCUMENTS

| | | | |
|---|---|---|---|
| 5,663,600 A | 9/1997 | Baek et al. | |
| 7,008,348 B2 | 3/2006 | LaBath | |
| 7,115,066 B1 | 10/2006 | Lee | |
| 7,297,086 B2 | 11/2007 | Fox | |
| 7,335,128 B2 | 2/2008 | Flamang et al. | |
| 7,538,446 B2 | 5/2009 | Bonnet | |
| 7,621,843 B2 | 11/2009 | Madge et al. | |
| 7,822,524 B2 | 10/2010 | Tabata et al. | |
| 7,935,020 B2 | 5/2011 | Jansen et al. | |
| 7,936,078 B2 | 5/2011 | Pavlak | |
| 8,038,402 B2 | 10/2011 | Ramanujam | |

(Continued)

FOREIGN PATENT DOCUMENTS

| | | |
|---|---|---|
| EP | 0635639 A1 | 1/1995 |
| EP | 2031273 A2 | 3/2009 |
| WO | WO 86/06452 | 11/1986 |

(Continued)

OTHER PUBLICATIONS

Zhao, Xueyong and Maiber, Peter "A novel power splitting drive train for variable speed wind power generators", Renewable Energy 28 (2003) 2001-2011.

Idan, M et al "A Robust Controller for a Novel Variable Speed Wind Turbine Transmission", Journal of Solar Energy Engineering, vol. 120, Nov. 1998, pp. 247-252.

*Primary Examiner* — Robert A Siconolfi
*Assistant Examiner* — Huan Le
(74) *Attorney, Agent, or Firm* — Dority & Manning, P.A.

(57) ABSTRACT

A wind turbine drivetrain is disclosed. The wind turbine drivetrain includes a planetary gearbox. The planetary gearbox includes a carrier rotatably driven at a first input rotational speed, and a planet gear rotatably mounted to the carrier. The planetary gearbox further includes a sun gear rotatably coupled to the planet gear, and a ring gear rotatably coupled to the planet gear. One of the carrier, the sun gear, or the ring gear is selectively rotatably driven at a second input rotational speed. The wind turbine drivetrain further includes an output gear rotatably driven by the planetary gearbox at an output rotational speed, and a motor selectively operable to rotatably drive the one of the carrier, the sun gear, or the ring gear.

20 Claims, 3 Drawing Sheets

(56) References Cited

U.S. PATENT DOCUMENTS

| | | | |
|---|---|---|---|
| 8,403,786 B2 * | 3/2013 | Bech | 475/5 |
| 2006/0205553 A1 | 9/2006 | Lee | |
| 2010/0230966 A1 | 9/2010 | Pavlak | |
| 2010/0276942 A1 * | 11/2010 | Hicks et al. | 290/1 C |
| 2011/0206517 A1 * | 8/2011 | Antonov et al. | 416/170 R |
| 2012/0025526 A1 | 2/2012 | Luo et al. | |
| 2012/0133155 A1 * | 5/2012 | Sorg | 290/1 C |

FOREIGN PATENT DOCUMENTS

| | | |
|---|---|---|
| WO | WO 96/30669 | 10/1996 |
| WO | WO 2005/012763 A1 | 2/2005 |
| WO | WO 2007/042847 A1 | 4/2007 |
| WO | WO 2010109162 A2 * | 9/2010 |

* cited by examiner

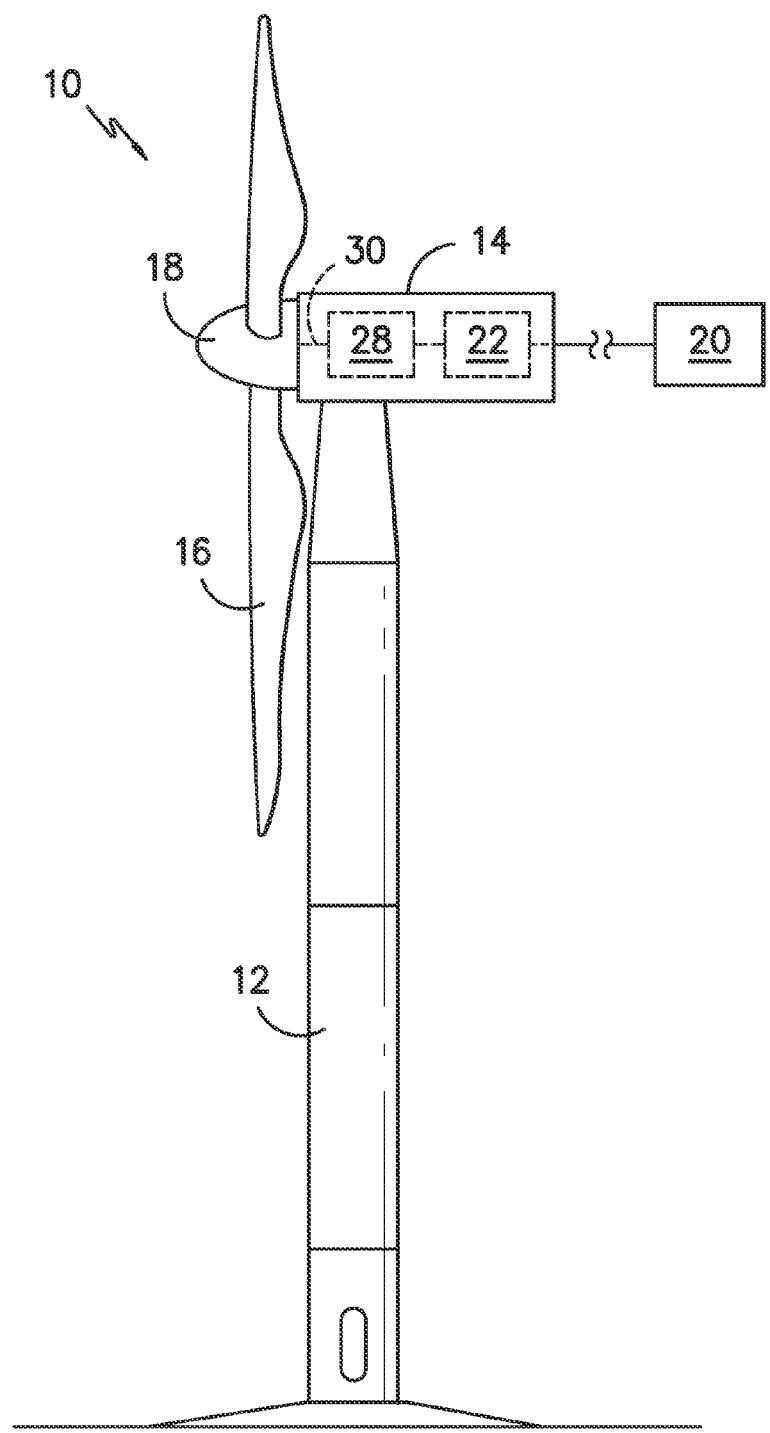
FIG. -1-
PRIOR ART

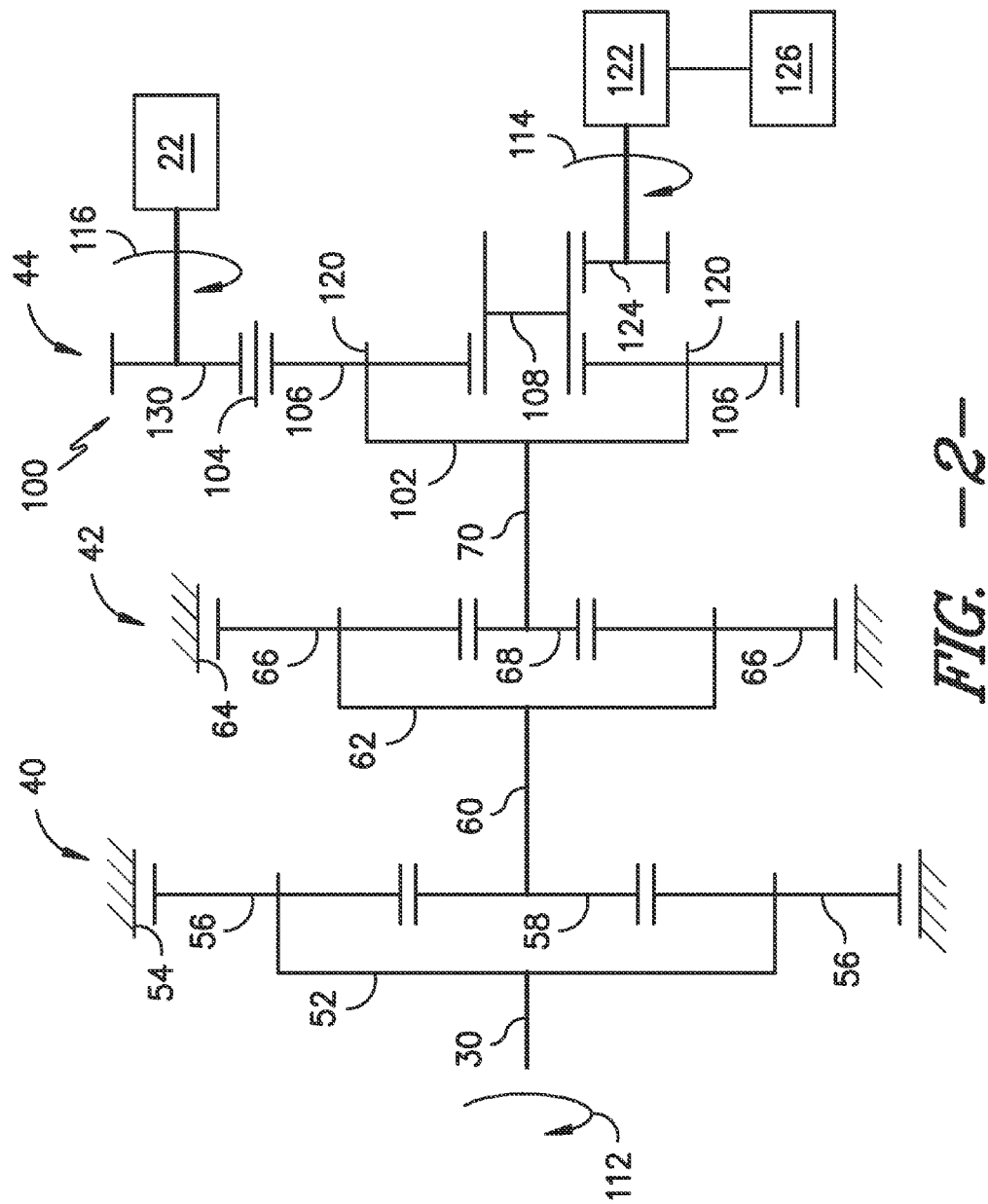
FIG. -2-

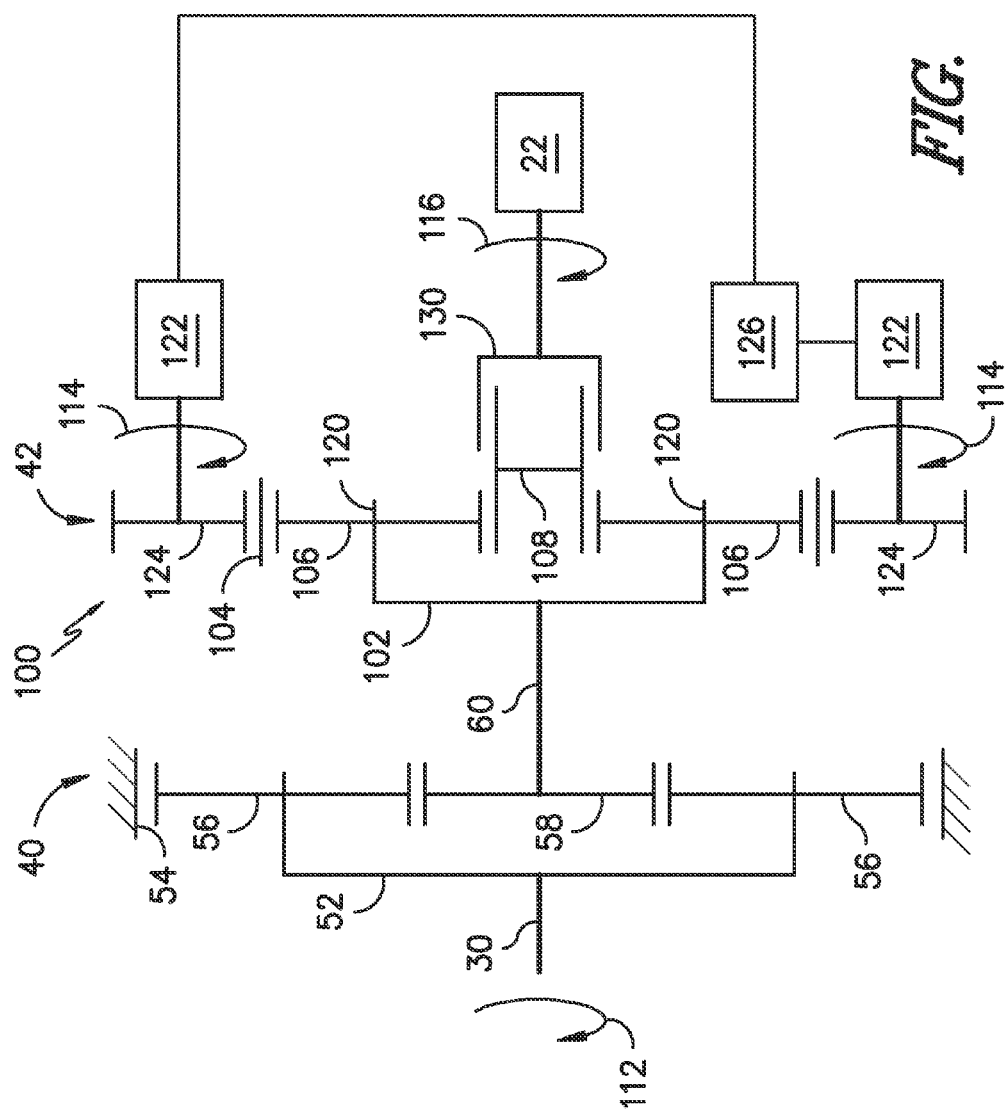
FIG. -3-

VARIABLE INPUT SYNCHRONOUS OUTPUT DRIVETRAIN FOR WIND TURBINE

FIELD OF THE INVENTION

The present disclosure relates in general to wind turbines, and more particularly to drivetrains capable of producing constant output speeds in wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Utility grids typically operate at a constant frequency, in most cases approximately 50 or 60 Hertz. It is desirable that the electrical energy output from the wind turbine to the utility grid matches this frequency. However, due to the changing wind speeds that interact with the wind turbines, the input speed of the rotor blades and shaft is volatile and unpredictable, thus operating at a wide variety of frequencies different from the required constant frequency of the utility grid.

Various methods and apparatus have been utilized to facilitate a constant output from the wind turbine to the utility grid. For example, frequency converters have been provided between the generator of a wind turbine and the utility grid. However, the addition of this step in the production and transmittal of energy to the utility grid is both expensive and inefficient, and significantly contributes to the amount of downtime and repairs experienced by a typical wind turbine, thus reducing the overall effectiveness of the wind turbine and associated wind farm. Other solutions for facilitating a constant output include the addition of mechanical systems, such as differential gear assemblies, which account for changing wind speeds. However, such known mechanical systems typically interface directly with the output of the drivetrain. Such systems take on the full mechanical power, including torque and speed, of the drivetrain, and attempt to adjust the speed of the output by converting the torque to an attainable value and compensating with the necessary addition of torque to result in a desired speed. Such systems must therefore experience and attempt to counter output speeds caused by virtually the full power of the wind. The systems therefore require large, powerful components, such as hydraulics, which are expensive, or require large energy inputs, which defeat the purpose of the wind turbine.

Accordingly, an improved wind turbine drivetrain is desired in the art. In particular, a wind turbine drivetrain that facilitates a constant output to the electrical grid, and is reliable, efficient, and affordable, would be advantageous.

BRIEF DESCRIPTION OF THE INVENTION

Aspects and advantages of the invention will be set forth in part in the following description, or may be obvious from the description, or may be learned through practice of the invention.

In one embodiment, a wind turbine drivetrain is disclosed. The wind turbine drivetrain includes a planetary gearbox. The planetary gearbox includes a carrier rotatably driven at a first input rotational speed, and a planet gear rotatably mounted to the carrier. The planetary gearbox further includes a sun gear rotatably coupled to the planet gear, and a ring gear rotatably coupled to the planet gear. One of the carrier, the sun gear, or the ring gear is selectively rotatably driven at a second input rotational speed. The wind turbine drivetrain further includes an output gear rotatably driven by the planetary gearbox at an output rotational speed, and a motor selectively operable to rotatably drive the one of the carrier, the sun gear, or the ring gear.

In another embodiment, a system for providing electrical energy to a utility grid at a grid frequency is disclosed. The system includes a wind turbine, the wind turbine including a drivetrain. The drivetrain includes a planetary gearbox including a carrier rotatably driven at a first input rotational speed, a planet gear rotatably mounted to the carrier, a sun gear rotatably coupled to the planet gear, and a ring gear rotatably coupled to the planet gear. One of the carrier, the sun gear, or the ring gear is selectively rotatably driven at a second input rotational speed. The drivetrain further includes an output gear rotatably driven by the planetary gearbox at an output rotational speed, a motor selectively operable to rotatably drive the one of the carrier, the sun gear, or the ring gear, and a controller configured to selectively operate the motor such that electrical energy is provided to the utility grid at the grid frequency.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is a schematic view of a drivetrain according to one embodiment of the present disclosure; and, FIG. 3 is a schematic view of a drivetrain according to another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

The rotor hub 18 may be configured to accept the rotor blades 16 thereon. For example, the rotor hub 18 may include a plurality of blade flanges (not shown). The blade flanges may be configured to engage mating flanges (not shown) on the rotor blades 16 to mount the rotor blades 16 to the flanges, and thus to the rotor hub 18.

As shown in FIGS. 1 through 3, the wind turbine may further be connected to a utility grid 20. For example, the wind turbine 10 may further include a generator 22. The generator 22 may be connected to the utility grid 20, as is generally understood in the art. In exemplary embodiments, the generator 22 may be housed in the nacelle 14. The generator 22 may be configured to accept mechanical energy from the rotor blades 16 and rotor hub 18 and convert this energy to electrical energy. For example, the generator 22 may include a rotor 24 and a stator 26. As is known in the art, the rotor 24 is a generally movable component of the generator 22, while the stator 26 is a generally stationary component of the generator 22. The generator 22 in exemplary embodiments may be a permanent magnet generator. However, it should be understood that the generator 22 according to the present disclosure is not limited to permanent magnet generators, and rather that any generator suitable for powering a wind turbine 10 is within the scope and spirit of the present disclosure.

In general, the rotor blades 16 may rotate the rotor 24 of the generator 22. The generator 22, such as the rotor 24, may be operably connected to the rotor hub 18. Operation of the rotor blades 16 rotates the rotor hub 18, which rotates the rotor 24 and thus operates the generator 22. Further, a drivetrain 28 for the generator 22 may be provided between the hub 18 and the rotor 24 to provide the operable connection between the hub 18 and the rotor 24. The drivetrain 28 may be operably connected to the hub 18, such as by an input shaft as discussed below, and to the rotor 24, as discussed below.

As shown, the drivetrain 28 according to the present disclosure may include a main input shaft 30, such as the main rotor shaft, configured to provide an input rotational speed. For example, the rotor hub 18 may be mounted to the main input shaft 30. The input shaft 30 may include a flange configured to engage a mating flange on the rotor hub 18 to mount the rotor hub 18 to the input shaft 30. Thus, during operation of the wind turbine 10, the rotational speed of the rotor blades 16 may be directly transmitted through the rotor hub 18 to the input shaft 30 as an input rotational speed. The input shaft 30 may be connected to a first stage gear assembly of the drivetrain 28, such as to a component thereof, and may thus rotatably drive the gear assembly at such input rotational speed.

As shown in FIGS. 2 and 3, a drivetrain 28 according to the present disclosure may further include one or more gear assemblies, or gearboxes. FIG. 2 illustrates a three stage drivetrain 28, having a first stage 40, a second stage 42, and a third stage 44. The generator 22 is connected, such as directly connected, to the third stage 44. FIG. 3 illustrates a two stage drivetrain 28, having a first stage 40 and a second stage 42. The generator 22 is connected, such as directly connected, to the second stage 42. It should be understood that the present disclosure is not limited to drivetrains having two or three stages, and that any suitable number of stages, including one, four, five or more, is within the scope and spirit of the present disclosure. In general, the generator 22 is connected to an end, or final, stage of the drivetrain 28.

With respect to the beginning and intermediate gearboxes in a drivetrain 28 according to the present disclosure, such as the first and second stages 40, 42 in FIG. 2 and the first stage 40 in FIG. 3, any suitable assembly or arrangement of gears may be utilized. Typically, however, such gearboxes according to the present disclosure are planetary gearboxes. In exemplary embodiments, the output rotational speed of each gearbox may be faster than the input rotational speed. Alternatively, however, the output rotational speed may be slower than the input rotational speed. The first stage gearbox 40 may be in communication with the main input shaft 30 such that the input rotational speed of the input shaft 30 is provided to the first stage gearbox 40. An output rotational speed of the first stage gearbox 40 may be the input rotational speed for the subsequent second stage gearbox 42, and so on for drivetrains 28 having three or more gearbox stages.

One embodiment of a planetary gearbox that may be utilized in beginning and intermediate stages of a drivetrain 28 according to the present disclosure includes a carrier and a plurality of gears. In various embodiments, various of the carrier and gears may be stationary and/or rotatable. For example, in the embodiments shown with respect to the first and second stages 40, 42 in FIG. 2 and the first stage 40 in FIG. 3, a rotatable carrier 52 is provided. The carrier 52 supports the gearbox and the various gears therein, and includes various axes for the rotatable gears to rotate about. In exemplary embodiments as shown, the first stage gearbox 40 comprises the carrier 52 and a stationary ring gear 54, at least one or a plurality of rotatable planetary gears 56, and a rotatable sun gear 58. In alternative embodiments, the carrier 52 may be stationary and the ring gear 54 may be rotatable, or the carrier 52 and ring gear 54 may be rotatable and the planet gears 56 or sun gear 58 may be stationary. While in some exemplary embodiments the gearbox 40 according to the present disclosure includes four planetary gears, it should be understood that more or less than four planetary gears are within the scope and spirit of the present disclosure.

Each gear in the gearbox 40 includes a plurality of gear teeth (not shown). The teeth may mesh together such that the various gears engage each other, as is generally known.

In exemplary embodiments, the carrier 52 may drive the planetary gearbox. Thus, the carrier 52 and main input shaft 30 may be in communication through any suitable connection such that the input rotational speed of the input shaft 30 is provided to the carrier 52. Alternatively, however, the ring gear 54 or sun gear 58 may drive the gearbox 40.

As shown and as discussed above, the first stage gearbox 40 is driven by the main input shaft 30, and converts the input rotational speed to an output rotational speed. In exemplary embodiments as shown, the sun gear 58 may rotate at the output rotational speed. Alternatively, however, the carrier 52 or ring gear 54 may be the output.

As discussed, the output rotational speed of the first stage gearbox 40 may be the input rotational speed of the subsequent gearbox. As shown in FIGS. 2 and 3, the subsequent gearbox may be second stage gearbox 42. In some embodiments as shown, a shaft 60 may be mounted to the sun gear 58 or other output, such that the shaft 60 rotates at the output rotational speed of the first stage gearbox 40 and provides the input rotational speed of the second stage gearbox 42. The shaft 60 may thus further be connected to an input of the second stage gearbox 42, which may be a carrier as shown or a suitable gear of the second stage gearbox 42. Alternatively, the sun gear 58 or other output may be otherwise connected to the input of the second stage gearbox through any suitable component, direct connection, or indirect connection.

In embodiments wherein the second stage gearbox 42 is an intermediate gearbox, as shown for example in FIG. 2, the second stage gearbox 42 may have any suitable configuration. In exemplary embodiments, the second gear may be a planetary gearbox. As shown and similar to the first stage gearbox 40 as discussed above, the second stage gearbox 42 may thus in these embodiments include a carrier 62, ring gear 64, plurality of planetary gears 66, and sun gear 68. The various gears may interact as discussed above with respect to the first stage gearbox 40, thus converting an input rotational speed into an output rotational speed. Similar to the first stage gearbox 40, a shaft 70 may be mounted to the sun gear 58 or other output, such that the shaft 70 rotates at the output rotational speed of the second stage gearbox 42 and provides the input rotational speed of the third stage gearbox 42, or the sun gear 58 or other output may be otherwise connected to the input of the third stage gearbox through any suitable component, direct connection, or indirect connection.

A final gearbox 100 provides the final conversion of input rotational speed to output rotational speed. As discussed, in some embodiments, the final gearbox 100 is the third stage gearbox 44 as shown in FIG. 2, or the second stage gearbox 42 as shown in FIG. 3. Alternatively, the final gearbox 100 may be the first stage gearbox 40 (the drivetrain 28 in these embodiments thus being a single stage drivetrain 28), a fourth stage gearbox, a fifth stage gearbox, or any other suitable gearbox. The final gearbox 100 advantageously facilitates and provides a generally constant output rotational speed and resulting frequency which can be matched to the frequency of the electrical grid. Further, drivetrains 28 utilizing such gearboxes 100 according to the present disclosure are reliable, efficient, and affordable.

As shown in FIGS. 2 and 3, a gearbox 100 includes a carrier 102, a ring gear 104, one or more planet gears 106, and a sun gear 108. As discussed above with respect to the first stage and second stage gearboxes, while in some exemplary embodiments the gearbox 40 according to the present disclosure includes four planet gears, it should be understood that more or less than four planet gears are within the scope and spirit of the present disclosure. Each gear in the gearbox 100 includes a plurality of gear teeth (not shown). The teeth may mesh together such that the various gears engage each other, as is generally known.

Advantageously, the carrier 102, ring gear 104, one or more planet gears 106, and sun gear 108, are each rotatable, thus facilitating the use of two potential inputs for the gearbox 100. The gearbox 100 thus provides the drivetrain 28 with variable input capability, and further facilitates the production of a synchronous output from the drivetrain 28, as discussed below. The carrier 102 is rotatably driven at a first input rotational speed 112. Thus, the carrier 102 may be connected to a shaft 30, 60, 70 or other suitable component which provides the input rotational speed 112 thereto. The planet gears 106 are rotatably mounted to the carrier 102. For example, the carrier 102 may include pins 120 extending therefrom, and which the planet gears 106 are mounted on. Each planet gear 106 is rotatable about the associated pin 120. Thus, each planet gear 106 is rotatable about two axes, the central axis of the carrier 102 and the central axis of the individual planet gear 106. The sun gear 108 is rotatably coupled to the planet gears 106, such that the gear teeth thereof mesh as discussed above. The ring gear 104 surrounds the planet gears 106 and sun gear 108 and is rotatably coupled to the planet gears 106, such that the gear teeth thereof mesh as discussed above.

Further, advantageously, one of the carrier 102, the sun gear 108, or the ring gear 104 is selectively rotatably driven at a second input rotational speed 114, and thus acts as a second input to the gearbox 100. In some embodiments, as shown in FIG. 2, the second input is the sun gear 108. In other embodiments, as shown in FIG. 3, the second input is the ring gear 104. In still other embodiments (not shown), the second input is the carrier 102. By providing a second input that is selectively rotatably driven at second input rotational speed 114, the output of the gearbox 100 and drivetrain 28 can be controlled. For example, when the first input rotational speed 112 is such that an output rotational speed 116 of the gearbox 100 matches the required output for supply to the grid at a required grid frequency, no additional input is required so the second input is not rotationally driven, and simply rotates as required based on the first input rotational speed 112 in the gearbox 100. However, when the first input rotational speed 112 is such that the output rotational speed 116 of the gearbox is higher or lower than the required output for supply to the grid, the input may be rotationally driven as required to increase or reduce the resulting output rotational speed 116.

One or more motors 122 may be included in the drivetrain 28, as shown. The motors 122 be selectively operably to rotationally drive the second input, and may thus for example be selectively operable at the second input rotational speed 114 or a rotational speed that results in the second input rotating at the second input rotational speed 114. A motor 122 may be an electric motor, a hydraulic motor, a gas-powered motor, or any other suitable motor or suitable device for selectively operating the second input.

In some embodiments, a motor 122 may be directly connected to the second input. In other embodiments as shown in FIGS. 2 and 3, one or more input gears 124, which may for example be pinion gears, may rotatably couple a motor and the second input. FIG. 2 illustrates a single input gear 124 rotatably coupling the motor 122 and the sun gear 108. FIG. 3 illustrates two input gears 124 rotatably coupling the ring gear 104 and the motor 122.

The drivetrain 28 may additionally include a controller 126. The controller 126 may be coupled to sensors (not shown) that monitor the first input rotational speed 112, output rotational speed 116, and/or grid frequency. The controller 126 may further be in communication with the motor 122, such as wirelessly or through a suitable wired connection, and may control the motor 122 to selectively operate the second input as required, as discussed above. The controller 126 may include any suitable hardware and/or software as required to evaluate and compare the output rotational speed and grid frequency, and may control and selectively operate the motor 122 such that an output rotational speed 116 is provided that is the required output for supply to the grid at the grid frequency.

As discussed, the combination of the first input rotational speed 112 and optional second input rotational speed 114 produce an output rotational speed 116. This output rotational speed 116 is produced in an output gear 130. The output gear 130 may be driven by the carrier 102, the sun gear 108, or the ring gear 104, or alternatively may be the carrier 102, the sun gear 108, or the ring gear 104. In one embodiment as shown in FIG. 2, for example, the output gear 130 may be rotatably driven by the ring gear 104. In another embodiment as shown in FIG. 3, for example, the output gear 130 (in this embodiment a hub) may be rotatably driven by the sun gear 108. The output gear 130 in turn may be connected to the rotor 24, thus providing the operably connection between the drivetrain 28 and the generator 22. Due to the selective operation of the second input, the generator 22 may thus be driven at a generally constant speed, and may advantageously produce an output to the utility grid that matches the frequency of the utility grid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine, comprising:
    a tower;
    a nacelle mounted to the tower;
    a rotor hub;
    a plurality of rotor blades mounted to the rotor hub; and,
    a drivetrain disposed in the nacelle and operably connected to the rotor hub, the drivetrain comprising:
    a planetary gearbox, comprising:
    a carrier rotatably driven at a first input rotational speed;
    a planet gear rotatably mounted to the carrier;
    a sun gear rotatably coupled to the planet gear; and,
    a ring gear meshed with the planet gear,
    wherein one of the sun gear or the ring gear is selectively rotatably driven at a second input rotational speed simultaneously with the rotation of the carrier at the first input rotational speed;
    an output gear rotatably driven by the planetary gearbox at an output rotational speed, the output gear meshed with the other of the sun gear or the ring gear; and,
    a motor selectively operable to rotatably drive the one of the sun gear or the ring gear.

2. The wind turbine of claim 1, wherein the sun gear is selectively rotatably driven at the second input rotational speed.

3. The wind turbine of claim 1, wherein the ring gear is selectively rotatably driven at the second input rotational speed.

4. The wind turbine of claim 1, wherein the output gear is rotatably driven by the sun gear of the planetary gearbox.

5. The wind turbine of claim 1, wherein the output gear is rotatably driven by the ring gear of the planetary gearbox.

6. The wind turbine of claim 1, wherein the planetary gearbox is a second stage planetary gearbox.

7. The wind turbine of claim 1, wherein the planetary gearbox is a third stage planetary gearbox.

8. The wind turbine of claim 1, wherein the planetary gearbox further comprises a plurality of planetary gears.

9. The wind turbine of claim 1, further comprising a generator, and wherein the drivetrain is operably connected to the generator.

10. The wind turbine of claim 1, wherein the drivetrain further comprises an input gear rotatably coupling the motor and the one of the sun gear or the ring gear.

11. The wind turbine of claim 10, wherein the input gear is a plurality of input gears.

12. A wind turbine drivetrain, comprising:
    a planetary gearbox, comprising:
    a carrier rotatably driven at a first input rotational speed;
    a planet gear rotatably mounted to the carrier;
    a sun gear rotatably coupled to the planet gear; and,
    a ring gear meshed with the planet gear,
    wherein one of the sun gear or the ring gear is selectively rotatably driven at a second input rotational speed simultaneously with the rotation of the carrier at the first input rotational speed;
    an output gear rotatably driven by the planetary gearbox at an output rotational speed, the output gear meshed with the other of the sun gear or the ring gear; and,
    a motor selectively operable to rotatably drive the one of the carrier, the sun gear, or the ring gear.

13. The wind turbine drivetrain of claim 12, further comprising an input gear rotatably coupling the motor and the one of the sun gear or the ring gear.

14. The wind turbine drivetrain of claim 12, wherein the sun gear is selectively rotatably driven at the second input rotational speed.

15. The wind turbine drivetrain of claim 12, wherein the ring gear is selectively rotatably driven at the second input rotational speed.

16. The wind turbine drivetrain of claim 12, wherein the output gear is rotatably driven by the sun gear of the planetary gearbox.

17. The wind turbine drivetrain of claim 12, wherein the output gear is rotatably driven by the ring gear of the planetary gearbox.

18. The wind turbine drivetrain of claim 12, wherein the planetary gearbox is a second stage planetary gearbox.

19. The wind turbine drivetrain of claim 12, wherein the planetary gearbox is a third stage planetary gearbox.

20. A system for providing electrical energy to a utility grid at a grid frequency, the system comprising:
    a wind turbine, the wind turbine comprising a drivetrain, the drivetrain comprising:
    a planetary gearbox, comprising:
    a carrier rotatably driven at a first input rotational speed;
    a planet gear rotatably mounted to the carrier;
    a sun gear rotatably coupled to the planet gear; and,
    a ring gear meshed with the planet gear,
    wherein one of the sun gear or the ring gear is selectively rotatably driven at a second input rotational speed simultaneously with the rotation of the carrier at the first input rotational speed;
    an output gear rotatably driven by the planetary gearbox at an output rotational speed, the output gear meshed with the other of the sun gear or the ring gear;
    a motor selectively operable to rotatably drive the one of the carrier, the sun gear, or the ring gear; and
    a controller configured to selectively operate the motor such that electrical energy is provided to the utility grid at the grid frequency.

* * * * *